(12) United States Patent
Davis (10) Patent No.: US 8,366,354 B2
(45) Date of Patent: Feb. 5, 2013

(54) ROTARY CUTTING TOOL WITH CHIP BREAKER PATTERN

(75) Inventor: Danny Ray Davis, Asheboro, NC (US)

(73) Assignee: Kennametal Inc., Latrobe, PA (US)

( * ) Notice: Subject to any disclaimer, the term of this patent is extended or adjusted under 35 U.S.C. 154(b) by 367 days.

(21) Appl. No.: 12/389,957

(22) Filed: Feb. 20, 2009

(65) Prior Publication Data

US 2010/0215447 A1    Aug. 26, 2010

(51) Int. Cl.
*B23C 5/10* (2006.01)
*B23C 5/00* (2006.01)

(52) U.S. Cl. ............... 407/59; 407/53; 407/63

(58) Field of Classification Search .......... 407/53, 407/59, 60, 61, 54
See application file for complete search history.

(56) References Cited

U.S. PATENT DOCUMENTS

| | | | | |
|---|---|---|---|---|
| 4,212,568 | A * | 7/1980 | Minicozzi | 407/53 |
| 4,285,618 | A * | 8/1981 | Shanley, Jr. | 407/54 |
| 4,497,600 | A * | 2/1985 | Kishimoto | 407/53 |
| 4,721,421 | A * | 1/1988 | Klinger | 407/63 |
| 4,740,121 | A * | 4/1988 | Arnold | 408/224 |
| 4,770,567 | A | 9/1988 | Moriarty | |
| 5,779,399 | A * | 7/1998 | Kuberski | 407/54 |
| 6,164,876 | A * | 12/2000 | Cordovano | 407/59 |
| 6,379,090 | B1 * | 4/2002 | Halley et al. | 408/227 |
| 6,899,494 | B2 * | 5/2005 | Walrath | 407/54 |
| 6,991,409 | B2 * | 1/2006 | Noland | 407/63 |
| 7,207,752 | B2 * | 4/2007 | Schulte | 408/224 |
| 7,544,021 | B2 * | 6/2009 | Flynn | 407/59 |
| 7,959,381 | B2 * | 6/2011 | Kienzle | 407/24 |
| 2007/0098506 | A1 | 5/2007 | Flynn | |
| 2008/0206000 | A1 | 8/2008 | Sasu et al. | |

FOREIGN PATENT DOCUMENTS

| | | |
|---|---|---|
| DE | 202006016531 U1 | 7/2007 |
| EP | 1072345 A2 | 1/2001 |
| JP | 8039323 A | 2/1996 |
| JP | 08-168915 A | 7/1996 |
| JP | 2002-273612 A | 9/2002 |
| JP | 2006-000981 A | 1/2006 |
| KR | 10-2002-0077582 A | 10/2002 |
| WO | 2008/018062 | 2/2008 |

OTHER PUBLICATIONS

PCT/US2010/023882—International Search Report and Written Opinion dated Dec. 6, 2010.

* cited by examiner

*Primary Examiner* — Will Fridie, Jr.
(74) *Attorney, Agent, or Firm* — Larry R. Meenan, Esq.

(57) ABSTRACT

A rotary cutting tool with a longitudinal axis includes a shank portion, a cutting portion, and a plurality of chip-breaking features. The cutting portion includes a plurality of blades and a plurality of flutes. The blades and flutes extend substantially along the length of the cutting portion and have unequally-indexed spacing. The flutes have a tapered depth along the longitudinal axis. Each blade includes a leading face, a trailing face, and a land surface that extends between the leading face and the trailing face. A plurality of chip-breaking features having a multi-radius profile are disposed in the land surfaces of the blades and are distributed in an offset chip breaker pattern among the blades such that each chip-breaking feature on one blade is not directly behind the chip-breaking features on immediately adjacent blades. The chip-breaking features on each blade are equidistant from each other.

18 Claims, 7 Drawing Sheets

ROTARY CUTTING TOOL WITH CHIP BREAKER PATTERN

FIELD OF THE INVENTION

The present invention pertains to a rotary cutting tool. More particularly, the present invention relates to an end mill having an offset chip breaker pattern such that each chip breaker on one blade is positioned between a respective chip breaker on the immediately adjacent blades.

BACKGROUND OF THE INVENTION

Rotary cutting tools, such as end mills, typically have a cylindrical configuration that includes a shank portion and a cutting portion. The cutting portion contains a plurality of helically disposed cutting blades that extend from a first end (i.e., the "shank end") of the cutting portion adjacent the shank portion, toward the opposite end (i.e., the "free end") of the cutting portion. In some embodiments, the cutting edges of the helical blades are disposed along a substantially constant radius with respect to the longitudinal axis of the tool. In other embodiments, generally referred to as "tapered" cutting tools, the cutting portion is substantially frustoconical in shape; i.e., the cutting edge of each blade has a constantly decreasing radius with respect to the longitudinal axis of the tool as the cutting edge extends from the shank end of the cutting portion to the free end. The cutting edges of the blades in a tapered rotary cutting tool are at the same radius from the longitudinal axis of the tool in any plane through the cutting portion and perpendicular to the longitudinal axis of the tool. In still other end mill embodiments, generally referred to as "straight-fluted" rotary cutting tools, the cutting edges of the blades extend parallel to the longitudinal axis of the tool.

There are several inherent problems in the use of any of the conventional rotary cutting tools described above. Generally, these problems manifest themselves in excessive wear and relatively poor cutting actions, or both, due to the fact that the entire length of the cutting edge may be applied to the workpiece at the same time, and due to the fact that continuous chips are produced which are not adequately removed from the work area. There have been many attempts to improve the cutting action and decrease the wear in such tools, and these attempts usually involve the use of so called "chip breakers" in the form of relatively deep notches cut transversely into the cutting blade in a pattern at spaced intervals, or some similar form of providing an interrupted cutting edge along each blade.

Figure 8:
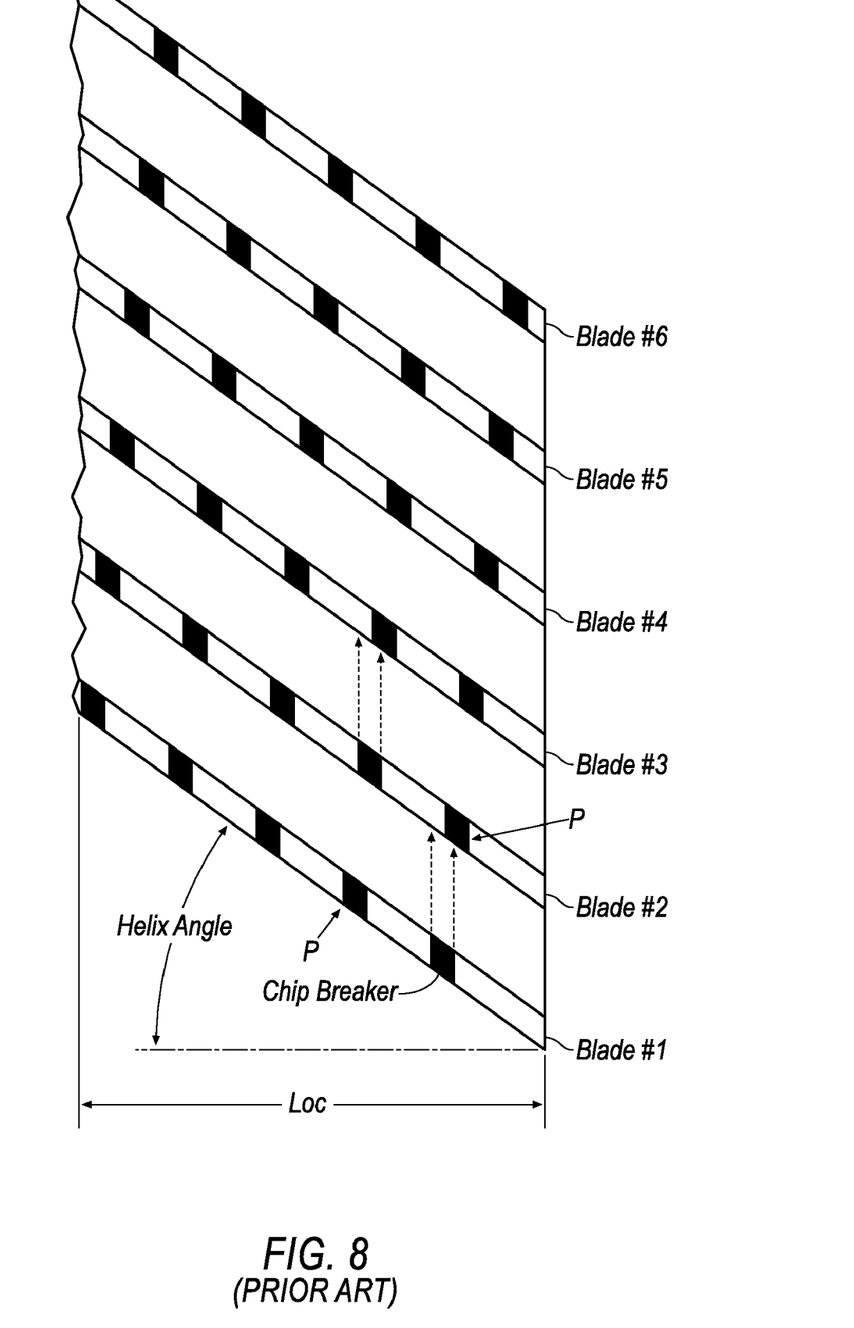
FIG. 8 is a schematic view of a six-fluted rotary cutting tool with a conventional chip breaker pattern.

A conventional chip breaker pattern for a six-fluted end mill design is shown in FIG. 8. As seen, the typical chip breaker pattern is such that a chip breakers on one blade, for example, blade #2 are directly behind the chip breakers on the adjacent blades #1 and #3 for a particular length-of-cut (LOC). The point, P, where the blade transitions back into the cut is a critical part of the geometry and is typically where tool failure occurs. Because this transition point is directly behind a chip breaker, this critical area of the tool has twice the amount of the programmed chip load per blade, which results in this area being even more prone to failure. Therefore, it is desirable to provide a rotary cutting tool that overcomes the shortcomings of the prior art.

SUMMARY OF THE INVENTION

In one aspect of the invention, a rotary cutting tool with a longitudinal axis comprises a shank portion; a cutting portion extending from the shank portion to a cutting tip, the cutting portion having a length of cut, and a plurality of blades separated by flutes extending along the length of cut, each of the blades including a leading face, a trailing face, a land surface extending between the leading face and the trailing face, and a cutting edge at the intersection between the leading face and the land surface; and a plurality of chip-breaking features disposed in the land surface of each blade in a chip breaker pattern that extends along the length of cut. The chip breaker pattern is such that the chip-breaking features disposed in the land surface of one blade is located between the chip-breaking features disposed in the land surface of immediately adjacent blades.

In another aspect of the invention, a rotary cutting tool with a longitudinal axis comprises a shank portion; a cutting portion extending from the shank portion to a cutting tip, the cutting portion having a length of cut, and a plurality of blades separated by flutes extending along the length of cut, each of the blades including a leading face, a trailing face, a land surface extending between the leading face and the trailing face, and a cutting edge at the intersection between the leading face and the land surface; and a plurality of chip-breaking features disposed in the land surface of each blade in a chip breaker pattern that extends along the length of cut. The chip breaker pattern begins at a first distance from the cutting tip for a first blade of the plurality of blades, the chip breaker pattern repeating at the first distance for each alternating blade of the plurality of blades. The chip breaker pattern begins at a second, different distance from the cutting tip for a second blade of the plurality of blades, the chip breaker pattern repeating at the second distance for each alternating blade of the plurality of blades.

In another aspect of the invention, a rotary cutting tool with a longitudinal axis comprises a shank portion; a cutting portion extending from the shank portion to a cutting tip, the cutting portion having a length of cut, and a plurality of blades separated by flutes extending along the length of cut, each of the blades including a leading face, a trailing face, a land surface extending between the leading face and the trailing face, and a cutting edge at the intersection between the leading face and the land surface; and a plurality of chip-breaking features disposed in the land surface of each blade in a pattern that extends along the length of cut. Each chip-breaking feature is formed by a small radius, a large radius and a joining radius therebetween.

BRIEF DESCRIPTION OF THE DRAWINGS

While various embodiments of the invention are illustrated, the particular embodiments shown should not be construed to limit the claims. It is anticipated that various changes and modifications may be made without departing from the scope of this invention.

DETAILED DESCRIPTION OF THE INVENTION

Figure 1:
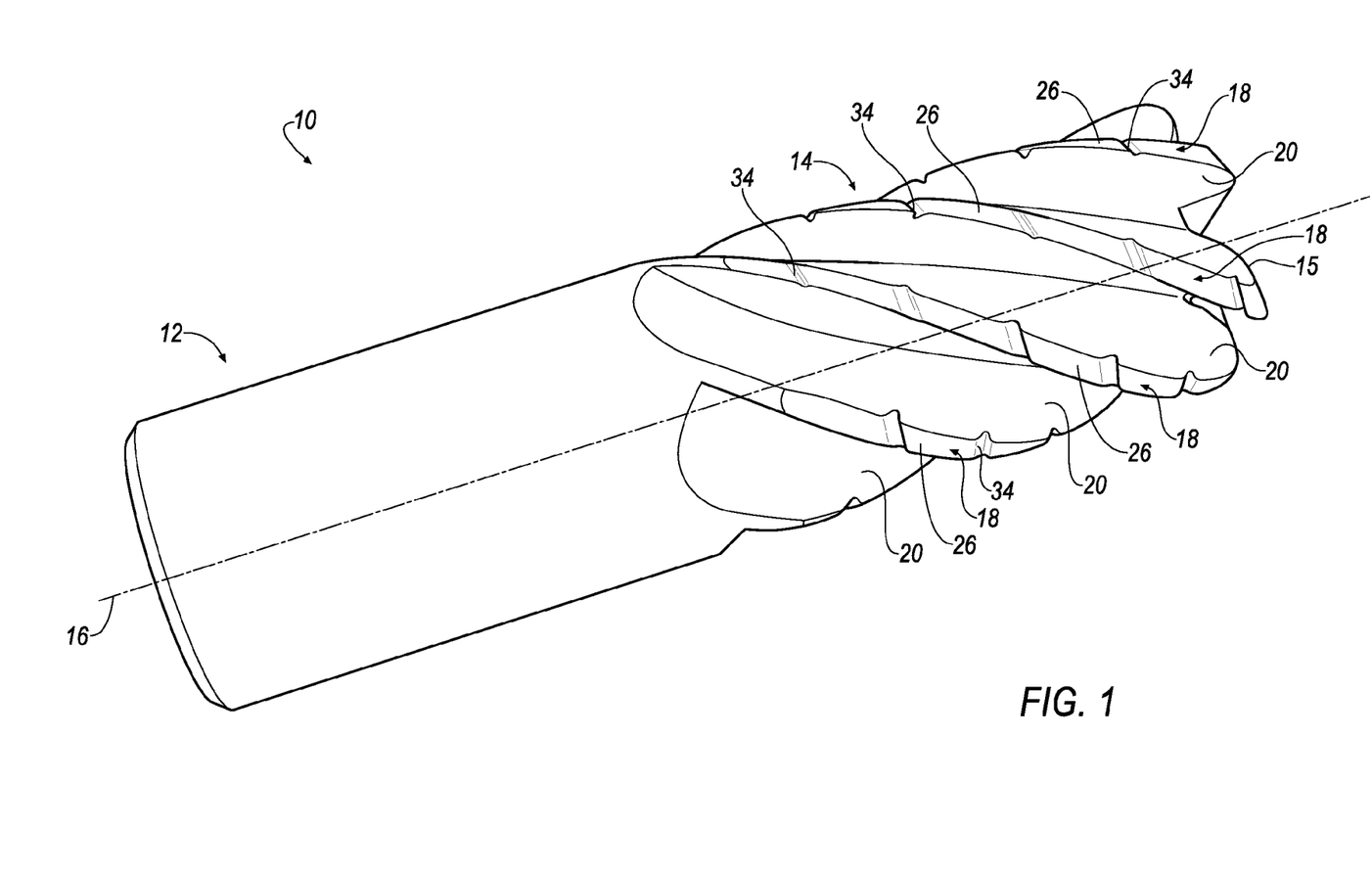
FIG. 1 is a perspective view of a rotary cutting tool with chip breaker pattern and unequally-indexed blade and flute spacing in accordance with an embodiment of the invention.
Figure 2:
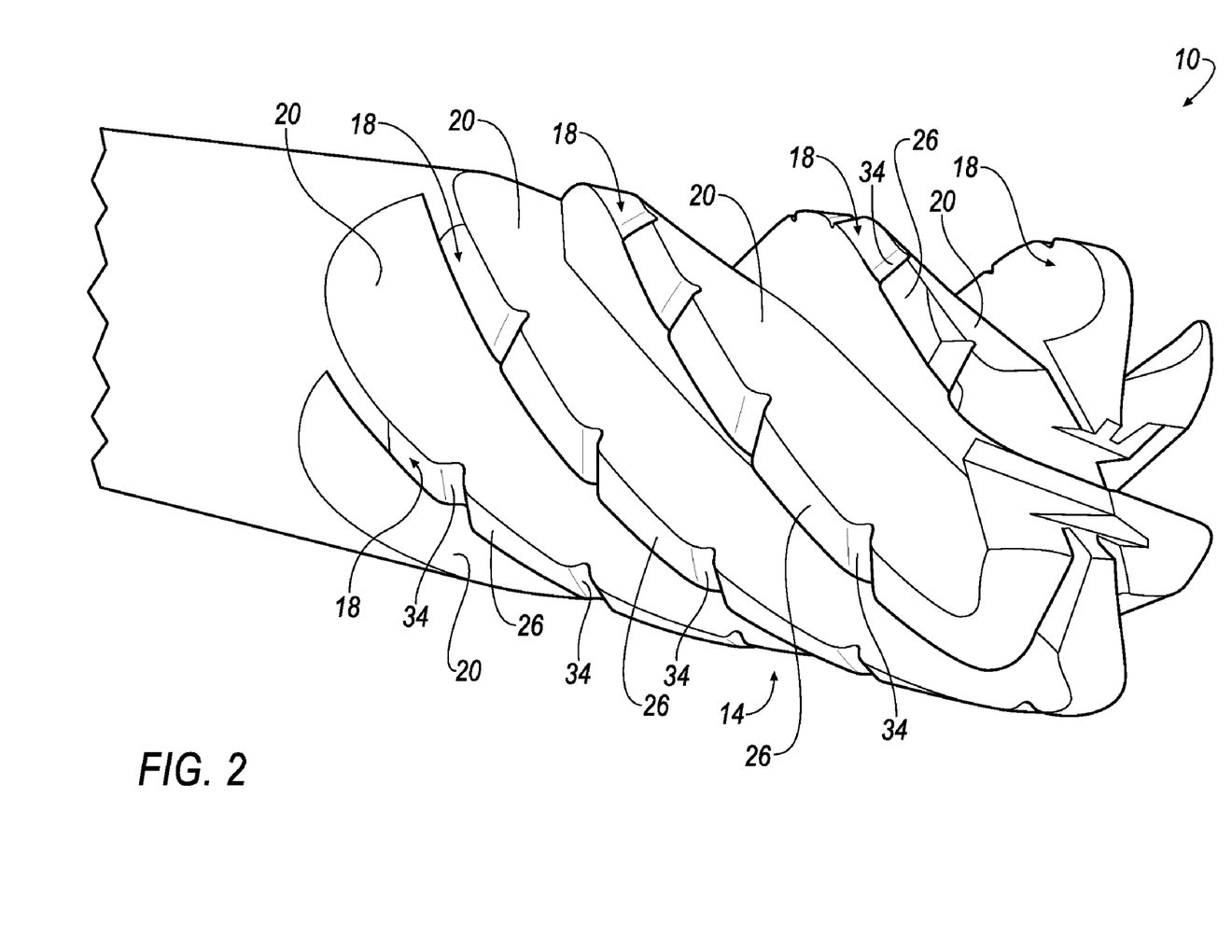
FIG. 2 is a perspective end view of the cutting portion of the rotary cutting tool of FIG. 1.

Referring now to FIGS. 1 and 2, a rotary cutting tool 10 is provided that includes a shank portion 12, a cutting portion 14 having a cutting tip 15, and a longitudinal axis 16. The overall shape of the cutting portion 14 may be, but is not limited to, a cylindrical shape or a frustoconical shape. The cutting portion 14 includes a plurality of blades 18 separated by flutes 20 extending the length of the cutting portion 14. In the illustrated embodiment, the rotary cutting tool 10 has a total of six (6) blades 18 and flutes 20. However, it will be appreciated that the invention is not limited by the number of blades and flutes, and that the invention can be practiced with a fewer or a greater number of blades and flutes. For example, the invention can be practiced with four (4) blades and flutes, eight (8) blades and flutes, and the like.

Figure 3:
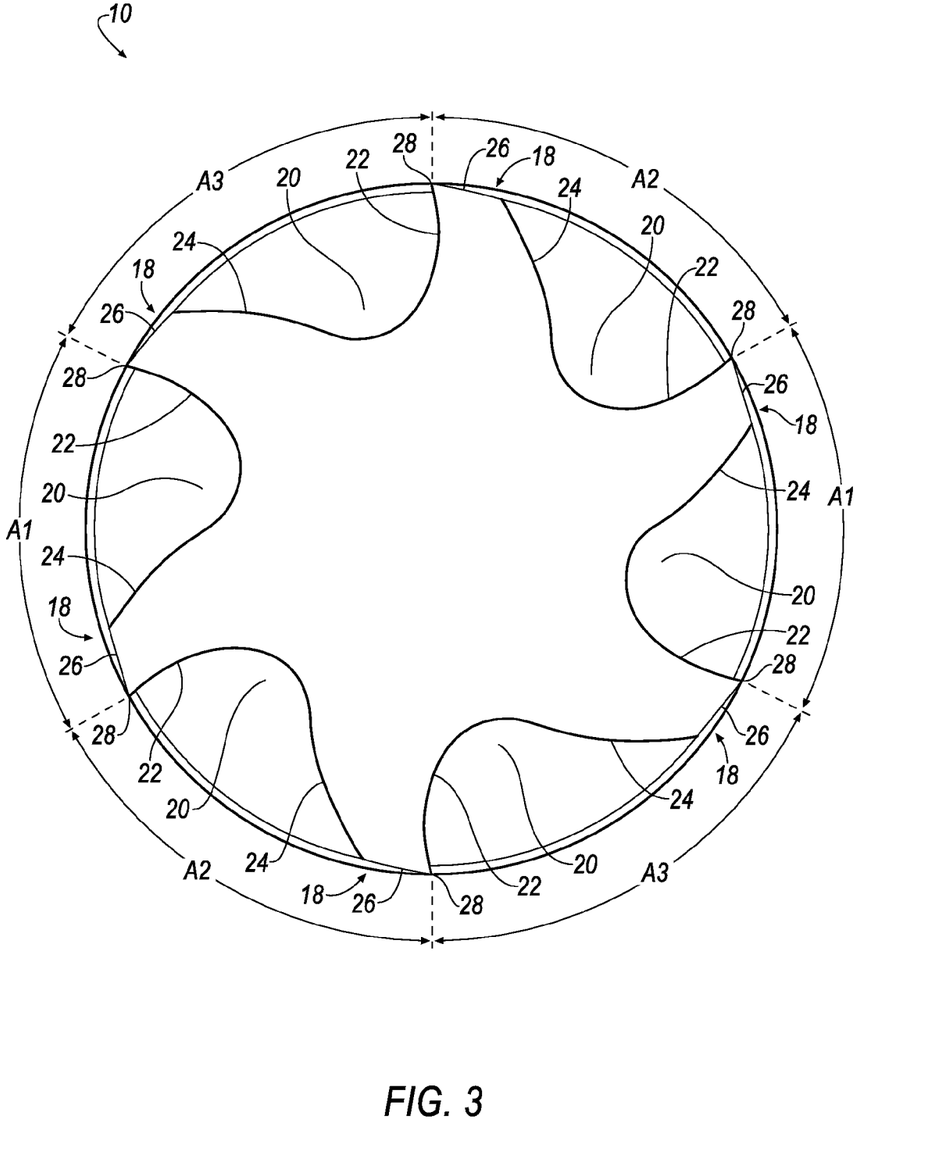
FIG. 3 is a cross-sectional view of the rotary cutting tool showing the unequally-indexed blade and flute spacing in accordance with an embodiment of the invention.
Figure 4:
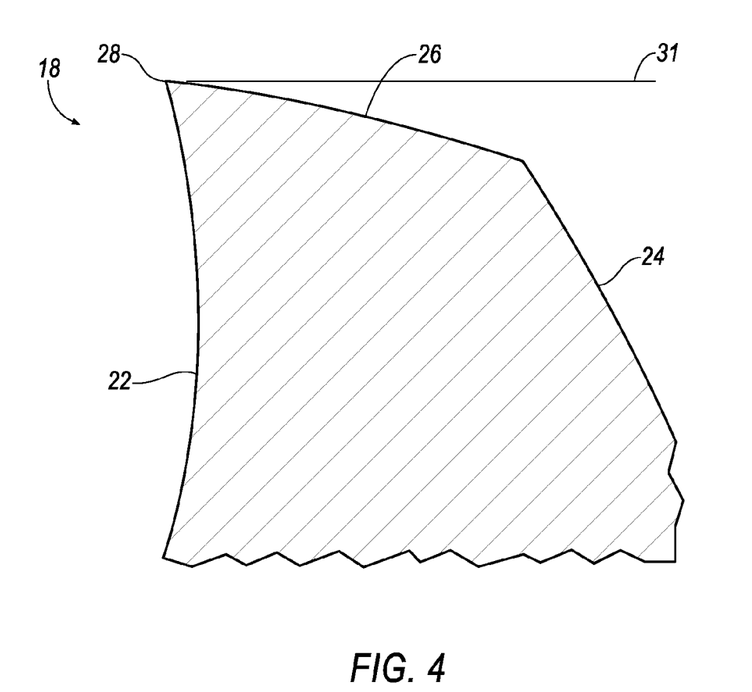
FIG. 4 is an enlarged cross-sectional view of the blade with eccentric radial relief in accordance with an embodiment of the invention.

Referring now to FIGS. 3 and 4, each of the blades 18 has a leading face 22, a trailing face 24, and a land surface 26 bridging the leading face 22 and trailing face 24. The intersection between the leading face 22 and the land surface 26 forms a cutting edge 28 for the respective blade 18. In some embodiments, the blades 18 and flutes 20 of the cutting portion 14 extend helically within the cutting portion 14 at a helix angle 30 (FIG. 7) of between about thirty (30) and about forty-five (45) degrees with respect to the longitudinal axis 16, and in other embodiments, the blades 18 and flutes 20 are "straight flutes" that extend parallel to the longitudinal axis 16. In the illustrated embodiment, the blades 18 and flutes 20 of the cutting portion 14 extend helically within the cutting portion 14 at a helix angle 30 of about thirty-eight (38) degrees.

As seen in FIG. 3, the angular spacing between the blades 18 and flutes 20 in one of the hemispheres of the rotary cutting tool 10 are unequal. In other words, the angular spacing between the cutting edges 28 of the blades 18 in one of the two hemispheres have three different magnitudes, but the total of the angular spacing between the cutting edges 28 is equal to 180 degrees. In the illustrated embodiment, for example, the angle, A1, is about fifty-six (56) degrees, the angle, A2, is about sixty (60) degrees, and the angle, A3, is about sixty-four (64) degrees (56 degrees+60 degrees+64 degrees=180 degrees). It will be appreciated that the angular spacing between the blades 18 and flutes 20 in the diagonally opposite hemisphere is a mirror image of the other hemisphere. Thus, the cutting edges 28 of diagonally opposite blades are radially aligned with each other.

It will also be appreciated that this principle of the invention can be applied to a rotary cutting tool having a different number of blades and flutes, as long there is an even number of blades and flutes. For example, this principle of the invention can be applied to a rotary cutting tool having four blades and flutes in which the angles A1, A2 in one hemisphere have two different magnitudes that total 180 degrees. Similarly, this principle of the invention can be applied to a rotary cutting tool having eight blades and flutes in which the angles A1, A2, A3, A4 in one hemisphere have four different magnitudes that total 180 degrees.

As seen in FIG. 4, the land surface 26 of each blade 18 extends arcuately (convex-shaped) within a plane 31 extending perpendicular to the longitudinal axis 16 (sometimes referred to as an "eccentric radial relief") blending into the trailing face 24.

Figure 5:
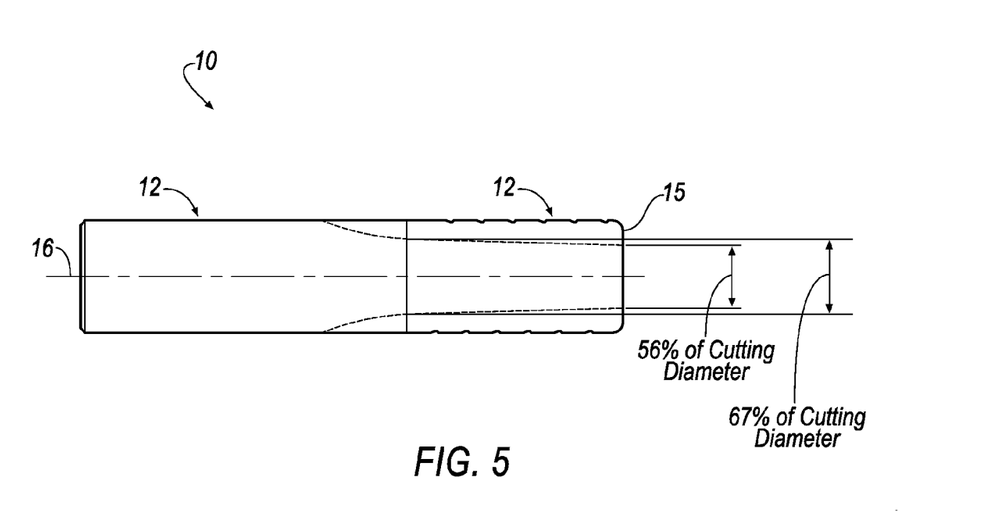
FIG. 5 is a plan view of a tapered fluted core design according to an embodiment of the invention.

Referring now to FIG. 5, the depth of the flutes 20 in the cutting portion 14 varies along the longitudinal axis 16 of the rotary cutting tool 10. Specifically, the depth of the flutes 20 in the cutting portion 14 is relatively less proximate the shank portion 12 and is relatively greater proximate the cutting tip 15. In the illustrated embodiment, for example, the depth of the flutes 20 may be about 67% of the cutting diameter proximate the shank portion 12 (shown as a solid line in FIG. 5) and about 56% of the cutting diameter proximate the cutting tip 15 (shown as a dashed line in FIG. 5).

Figure 6:
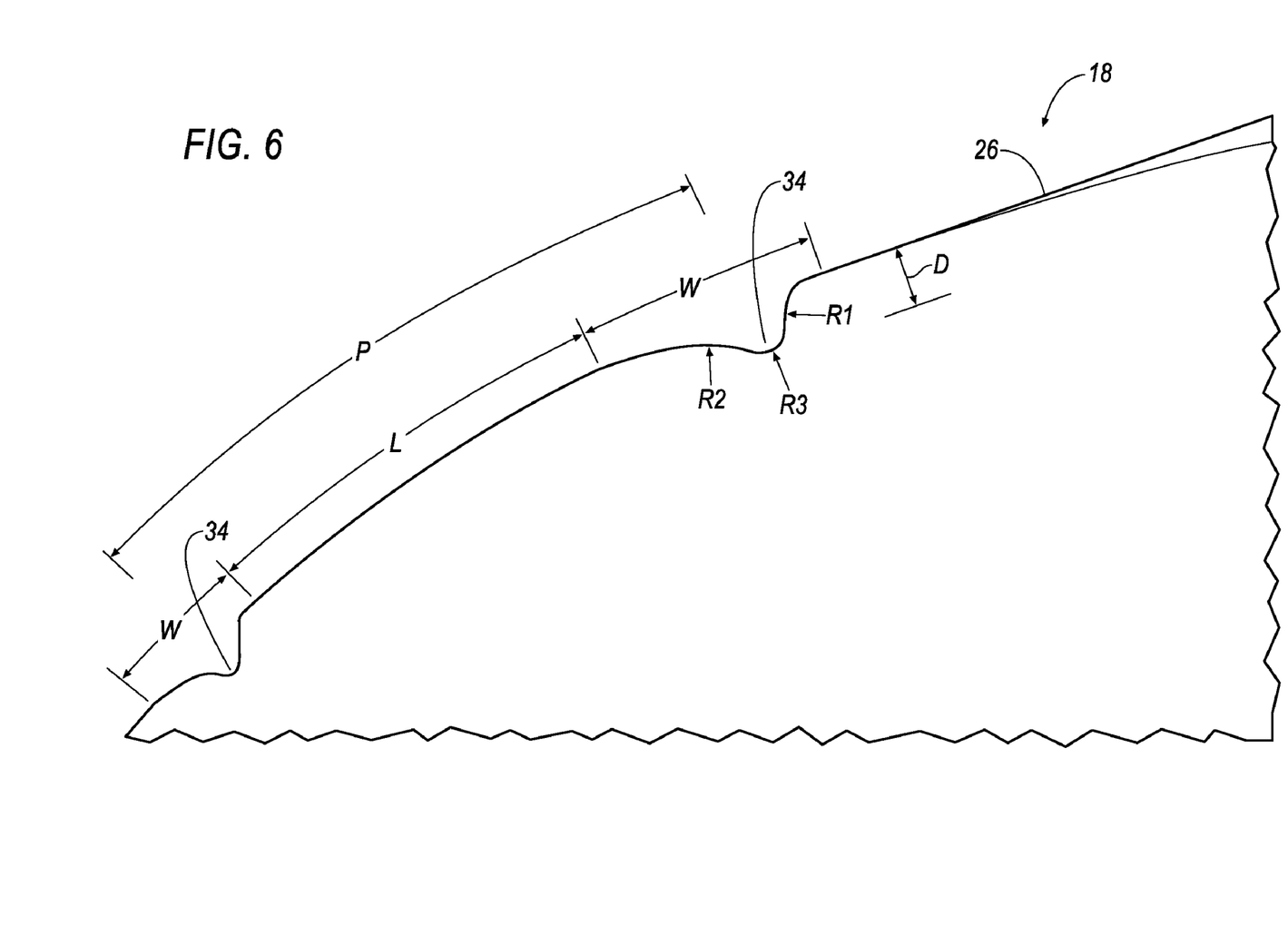
FIG. 6 is an enlarged view of the chip-breaking feature according to an embodiment of the invention.

Referring now to FIGS. 1, 2 and 6, a plurality of chip-breaking features 34 in the form of chip breakers are disposed in the land surface 26 of each blade 18. The chip-breaking features 34 disrupt the otherwise continuous cutting edge 28, and thereby create a cutting edge 28 having a varied geometry at the intersection of the leading face 22 and the land surface 26. During operation, the chip-breaking features 34 generate a positive pressure relief in the blade 18 in which they are disposed, and thereby significantly enhance the cutting performance of the rotary cutting tool 10.

The profile of each chip-breaking feature 34 includes a small radius portion, R1, a large radius portion, R2, which has a larger radius than the small radius portion, R1, and a joining radius portion, R3, between the small radius portion, R1, and the large radius portion, R2. As shown in FIG. 5, the large radius portion, R2, is closer to the shank portion 12 than the small radius portion, R1 (the direction of the shank portion 12 is indicated by the arrow in FIG. 5). In other words, the small radius portion, R1, is closer to the cutting tip 15 than the larger radius portion, R2. The chip-breaking feature 34 has a width, W, and a depth, D, into the land surface 26. The depth, D, is proportional to the cutting diameter of the rotary cutting tool 10. The pitch, P, is the distance between two immediately adjacent chip-breaking features 34 along the land surface 26 of the blade 18. The length, L, between the two immediately adjacent chip-breaking features 34 is the distance between the widths, W, of the chip-breaking features 34. In other words, the length, L, defines the land surface 26 in which the chip-breaking feature 34 is not present on the blade 18.

Figure 7:
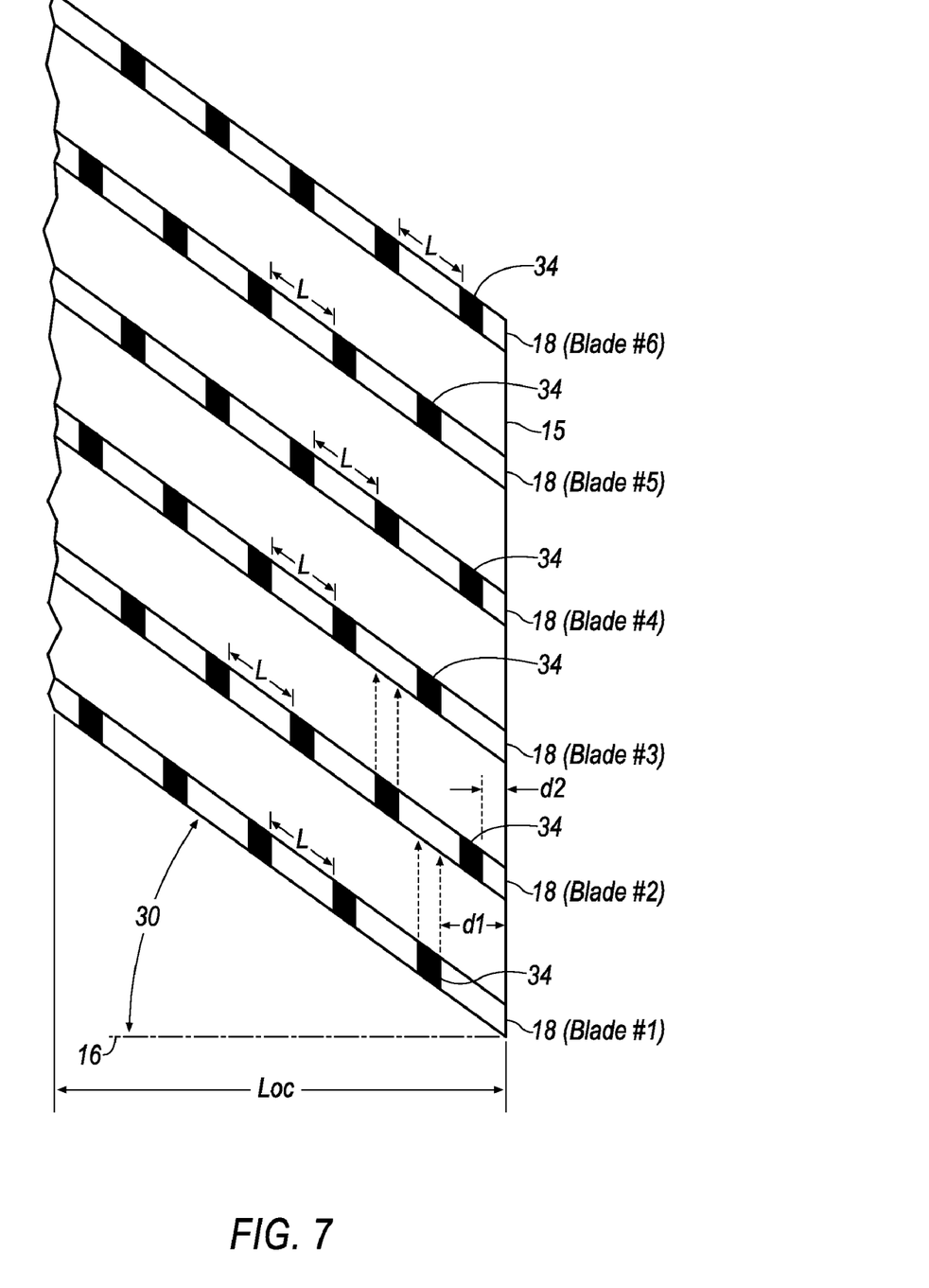
FIG. 7 is a schematic view of a six-fluted rotary cutting tool with a chip breaker pattern in which a chip-breaking feature is located between chip-breaking features on an immediately adjacent blade in accordance with an embodiment of the invention.

Referring now to FIG. 7, the pattern of the chip-breaking features 34 are schematically shown in accordance with one aspect of the invention. In the pattern shown in FIG. 7, each chip-breaking feature 34 on a particular blade 18 is not located directly behind (or in front) of a chip-breaking feature 34 on immediately adjacent blades 18. In other words, each chip-breaking feature 34 on a particular blade 18 is located between two chip-breaking features 34 defined by the length, L, on the immediately adjacent blades 18. It is also noted that the chip-breaking features 34 on all the blades 18 are separated by the length, L. In other words, the chip-breaking features 34 on each blade 18 are equidistant from each other.

Referring now to FIG. 7, the chip breaker pattern 32 of each blade 18 in a six-bladed end mill design is schematically shown according to an embodiment of the invention. One aspect of the invention is that the distances from the cutting tip at which the chip breaker pattern begins is substantially identical for each alternating blade. In other words, in the illustrated six-bladed design, the chip breaker pattern 32 begins at a first distance, d1, from the cutting tip 15 for blades #1, #3 and #5, and the chip breaker pattern 32 begins at a second distance, d2, from the cutting tip 15 for blades #2, #4 and #6. As a result of this unique chip breaker pattern, the transition point, P, where the blade 18 transitions back into the cut is not directly behind a chip-breaking feature 34 of an immediately adjacent blade 18. Thus, this area of the tool 10 does not have a larger amount of the programmed chip load per blade, thereby reducing the failure rate in this area of the rotary cutting tool 10 as compared to the conventional rotary cutting tool shown in FIG. 8.

The patents and publications referred to herein are hereby incorporated by reference.

Having described presently preferred embodiments the invention may be otherwise embodied within the scope of the appended claims.

What is claimed is:

1. A rotary cutting tool with a longitudinal axis, comprising:
   a shank portion; and
   a cutting portion extending from the shank portion to a cutting tip, the cutting portion having a length of cut, and a plurality of blades separated by unequally spaced flutes, each of the blades including a leading face, a trailing face, a land surface extending between the leading face and the trailing face, and a cutting edge at the intersection between the leading face and the land surface, each blade including a chip-breaker pattern extending along the length of cut having a plurality of chip-breaking features disposed in the land surface of each blade wherein the chip breaker pattern begins at a first distance from the cutting tip for a first blade of the plurality of blades, the chip-breaker pattern repeating at the first distance for each alternating blade of the plurality of blades, and
   wherein the chip-breaker pattern begins at a second, different distance from the cutting tip for a second blade of the plurality of blades, the second blade immediately adjacent the first blade, the chip-breaker pattern repeating at the second distance for each alternating blade of the plurality of blades, and
   wherein the chip-breaking features on each blade of the plurality of blades are equidistant from each other.

2. The rotary cutting tool according to claim 1, wherein each chip-breaking feature is formed by a small radius, a large radius and a joining radius therebetween.

3. The rotary cutting tool according to claim 2, wherein the small radius is closer to the cutting tip than the large radius.

4. The rotary cutting tool according to claim 1, wherein a depth of each flute varies along the longitudinal axis from the cutting tip toward the shank portion.

5. The rotary cutting tool according to claim 4, wherein the depth of each flute is greater proximate the cutting tip.

6. The rotary cutting tool according to claim 1, wherein each blade forms a helix angle between about thirty degrees and about forty-five degrees with respect to the longitudinal axis.

7. A rotary cutting tool with a longitudinal axis, comprising:
   a shank portion; and
   a cutting portion extending from the shank portion to a cutting tip, the cutting portion having a length of cut, and a plurality of blades separated by unequally spaced flutes, each of the blades including a leading face, a trailing face, a land surface extending between the leading face and the trailing face, and a cutting edge at the intersection between the leading face and the land surface; and
   a plurality of chip-breaking features disposed in the land surface of each blade in a chip breaker pattern that extends along the length of cut,
   wherein the chip breaker pattern begins at a first distance from the cutting tip for a first blade of the plurality of blades, the chip breaker pattern repeating at the first distance for each alternating blade of the plurality of blades, and
   wherein the chip breaker pattern begins at a second, different distance from the cutting tip for a second blade of the plurality of blades, the chip breaker pattern repeating at the second distance for each alternating blade of the plurality of blades, and
   wherein the chip-breaking features on each blade of the plurality of blades are equidistant from each other.

8. The rotary cutting tool according to claim 7, wherein each chip-breaking feature is formed by a small radius, a large radius and a joining radius therebetween.

9. The rotary cutting tool according to claim 8, wherein the small radius is closer to the cutting tip than the large radius.

10. The rotary cutting tool according to claim 7, wherein a depth of each flute varies along the longitudinal axis from the cutting tip toward the shank portion.

11. The rotary cutting tool according to claim 10, wherein the depth of each flute is greater proximate the cutting tip.

12. The rotary cutting tool according to claim 7, wherein each blade forms a helix angle between about thirty degrees and about forty-five degrees with respect to the longitudinal axis.

13. A rotary cutting tool with a longitudinal axis, comprising:
    a shank portion;
    a cutting portion extending from the shank portion to a cutting tip, the cutting portion having a length of cut, and a plurality of blades separated by unequally spaced flutes, each of the blades including a leading face, a trailing face, a land surface extending between the leading face and the trailing face, and a cutting edge at the intersection between the leading face and the land surface; and
    a plurality of chip-breaking features disposed in the land surface of each blade in a pattern that extends along the length of cut,
    wherein each chip-breaking feature is formed by a small radius, a large radius and a joining radius therebetween, and
    wherein the pattern begins at a distance from the cutting tip for a first blade of the plurality of blades, the pattern repeating at the first distance for each alternating blade of the plurality of blades, and
    wherein the pattern begins at a second, different distance from the cutting tip for a second blade of the plurality of blades, the pattern repeating at the second distance for each alternating blade of the plurality of blades, and
    wherein the chip-breaking features on each blade of the plurality of blades are equidistant from each other.

14. The rotary cutting tool according to claim 13, wherein the small radius is closer to the cutting tip than the large radius.

15. The rotary cutting tool according to claim 13, wherein a depth of each flute varies along the longitudinal axis from the cutting tip toward the shank portion.

16. The rotary cutting tool according to claim 15, wherein the depth of each flute is greater proximate the cutting tip.

17. The rotary cutting tool according to claim 13, wherein each blade forms a helix angle between about thirty degrees and about forty-five degrees with respect to the longitudinal axis.

18. The rotary cutting tool according to claim 17, wherein the helix angle of each flute is equal.

* * * * *